Sept. 1, 1925.

E. E. SKINNER

TOOL

Filed April 3, 1925

1,551,854

Inventor
E. E. Skinner
By C. A. Snow & Co.
Attorneys.

Patented Sept. 1, 1925.

1,551,854

UNITED STATES PATENT OFFICE.

EMERSON E. SKINNER, OF ELGIN, NEBRASKA.

TOOL.

Application filed April 3, 1925. Serial No. 20,493.

*To all whom it may concern:*

Be it known that I, EMERSON E. SKINNER, a citizen of the United States, residing at Elgin, in the county of Antelope and State of Nebraska, have invented a new and useful Tool, of which the following is a specification.

This invention aims to provide a simple tool which will be peculiarly efficient for working down roughly, the surface of a wooden article which may be flat, concaved or convexed, the tool being particularly valuable for use on surfaces which are knurly, glue-coated or varnished.

It is within the province of the disclosure to improve generally and to enhance the utility of devices of that sort to which the invention appertains.

Although a preferred form has been shown, a mechanic, working within the scope of what is claimed, may change that form without departing from the spirit of the invention.

Figure 1:
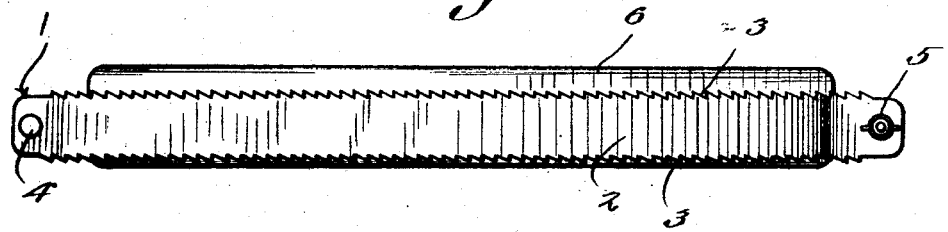
Figure 2:
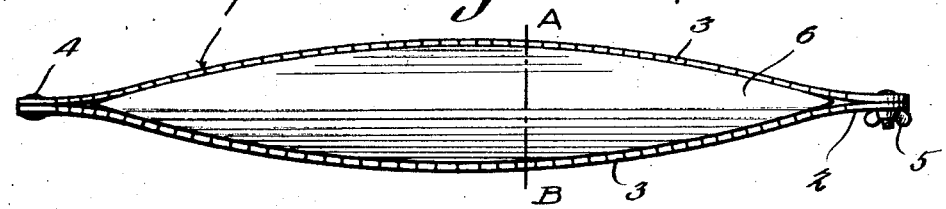
Figure 3:
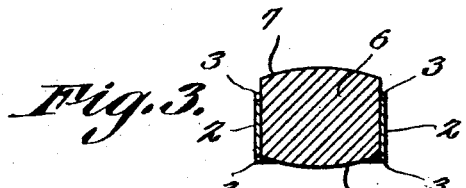
Figure 4:
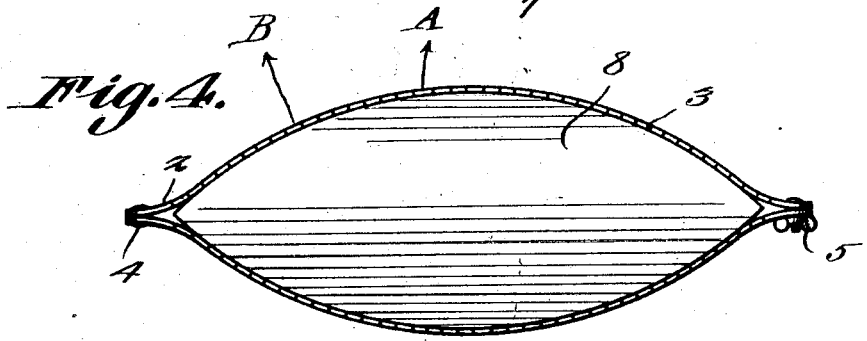
Figure 5:
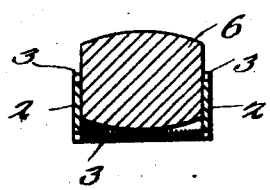

In the drawings:—Figure 1 shows in side elevation, a device constructed in accordance with the invention; Figure 2 is a plan; Figure 3 is a cross section taken on the line A—B of Fig. 2; Figure 4 is a plan showing a modification; Figure 5 is a cross section taken on the line A—B of Fig. 2, the view being similar to Figure 3 but showing the abrasive member moved down a little from the position of Figure 3, so as to work on a flat surface.

The device comprises a resilient rasp member 1 which may be described roughly as being loop-shaped, the member 1 being pointed at its ends, and being made up of blades 2, each blade having teeth 3 on both of its edges, the teeth of one blade being alined with the teeth of the opposite blade, for a purpose which will be explained hereinafter. The ends of the blades 2 are held together by fastening devices of any kind. One fastening device may be a rivet 4, and the other fastening device may be a small bolt and wing nut 5, permitting the blades 2 to be opened with respect to each other—although the use of the bolt and wing nut 5 is optional: its place may be taken by a fastening device of some other kind.

Within the rasp member 1 is placed a spreader block 6 which tapers at its ends to a point, the spreader substantially filling the member 1. The working surfaces 7 of the spreader block 6 slant from the longitudinal center of each surface 7 to the outer edges thereof, as shown best in Figures 3 and 5.

The device may be used in many ways, depending upon the nature of the work, the desires of the mechanic, and the like. For instance, as shown in Figure 3, one of the working surfaces 7 of the spreader 6 may be permitted to extend down a little below the teeth 3. Then, the tool may be rocked on its longitudinal axis, so that the intermediate portion of either blade 2 will work down into a concavity. The spreader block 6 may be replaced by a wider spreader block 8, as in Figure 4, to permit the tool to get down into a more pronounced concavity than would be the case if the spreader block 6 of Figure 2 were used. If a flat surface is to be operated on, the block 6 may be raised far enough so that, as shown in Figure 5, the teeth 3 of both blades may be used at once. Owing to the shape of the blocks 6 and 8, the blades 2 are so held that if the device is pushed or pulled in the direction of the arrow A in Figure 4, some of the teeth will cut in the direction of the arrow B in Figure 4.

Because the teeth of the blades 2 are in alinement, the teeth on the two blades will match up when the block 6 is removed, and the teeth on both blades may be filed at once. The spreader block 6 fits so tightly between the blades 2 that it will hold its place while the tool is in use, but the block can be adjusted up or down by tapping it smartly with a hammer. By adjusting the spreader block 6 up and down, it may be made to serve as a depth gage. Furthermore, Figures 1 and 3 show that the spreader serves to protect the teeth 3 from being dulled when the device is not in use. The tool is used in both hands and will afford a diagonal sweep cut which will be very efficient in wearing away the surface of the work. When it is desired to cut particularly fast, the tool may be turned a little on its longitudinal axis so that the corners of the teeth 3 will work into the wood. Because the blades 2 have teeth upon both their upper and lower edges, the working life of the device, of course, is doubled, the upper and lower surfaces of the block 6 being convexed alike, as shown at 7.

I claim:—

1. In a device of the class described, a loop-shaped rasp member which tapers toward its ends and a correspondingly shaped spreader within the rasp member.

2. In a device of the class described, a resilient loop-shaped rasp member made up of blades having teeth which match, so that the teeth of both blades may be sharpened at once when the blades are brought together, and a spreader within the rasp member.

3. In a device of the class described, a resilient loop-shaped member made up of blades having teeth on both of their longitudinal edges, the said member tapering toward its ends, and a correspondingly shaped spreader within the resilient member.

4. In a device of the class described, a resilient loop-shaped member made up of blades connected at their ends, and a spreader substantially filling the loop-shaped member and of greater height than the width of the blades, thereby enabling the spreader to serve as a handle when the device is in use.

5. In a device of the class described, a rasp member made up of blades connected at their ends, and a spreader between the blades, the spreader tapering toward the ends of the blades, and the working surfaces of the spreader slanting in opposite directions from the longitudinal centers of said surfaces toward the outer edges thereof.

6. In a device of the class described, a rasp member of loop form and tapering toward its ends, and correspondingly shaped spreaders adapted for interchangeable mounting within the rasp member thereby to vary the width of the said member from side to side and to vary the slant of the said member from its intermediate portion toward its ends.

In testimony that I claim the foregoing as my own, I have hereto affixed my signature.

EMERSON E. SKINNER.